United States Patent [19]

Glorioso

[11] 3,826,893

[45] July 30, 1974

[54] SINGLE PHASE T-R UNIT
[75] Inventor: Paul A. Glorioso, Amherst, Ohio
[73] Assignee: TRW Inc., Cleveland, Ohio
[22] Filed: Nov. 12, 1971
[21] Appl. No.: 198,145

[52] U.S. Cl. .............................. 219/98, 219/131 R
[51] Int. Cl. ......................... B23k 9/00, B23k 9/04
[58] Field of Search ......... 219/98, 69 P, 135, 131 R

[56] References Cited
UNITED STATES PATENTS
3,158,728  11/1964  Webb ............................... 219/69 P
3,176,112   3/1965  Stokes ................................. 219/98
3,346,715  10/1967  Jenkins ............................... 219/98
3,414,701  12/1968  Guettel ............................... 219/98
3,526,742   1/1970  Hill .................................... 219/98
3,562,485   2/1971  Glorioso ............................. 219/98

Primary Examiner—E. A. Goldberg
Assistant Examiner—Hugh D. Jaeger
Attorney, Agent, or Firm—Allen D. Gutchess, Jr.

[57] ABSTRACT

A solid state control circuit and an alternating current power source for stud welding apparatus are provided. The controls utilize a sustaining arc to maintain electrical continuity, and apply pulsating DC as a source for the main welding arc and filtered DC for use in the initiation and timing circuit. The pulsating direct current is phase controlled to regulate the intensity of the main welding arc.

5 Claims, 2 Drawing Figures

SINGLE PHASE T-R UNIT

BACKGROUND OF THE INVENTION

In the past, to end weld a stud to a support or workpiece the end of the stud to be welded is placed in contact with the portion of the support with which it is to be welded. Power is then applied to the stud and the support and the stud is retracted from the support substantially at the same time to a predetermined retracted position. Usually after the stud reaches the retracted position more power is applied and a heavy main welding arc is initiated over the pilot arc for a predetermined period. The stud is then plunged against the support to join the two by virtue of the molten metal formed on the support and on the end of the stud by the intense main welding arc.

SUMMARY OF THE INVENTION

This invention relates to a control circuit for stud welding apparatus.

An object of the present invention is to provide a control circuit for a stud welding apparatus which applies a filtered DC to the initiation and timing circuit and an unfiltered pulsing DC to the main welding circuit.

Another object of the present invention is to provide a control circuit for stud welding apparatus which creates a sustaining arc which is continuous during the welding cycle and on which the main welding current is superimposed.

A still further object of the present invention is to provide a simple, inexpensive circuitry for stud welding apparatus.

DESCRIPTION OF THE PREFERRED EMBODIMENT

Figure 1:
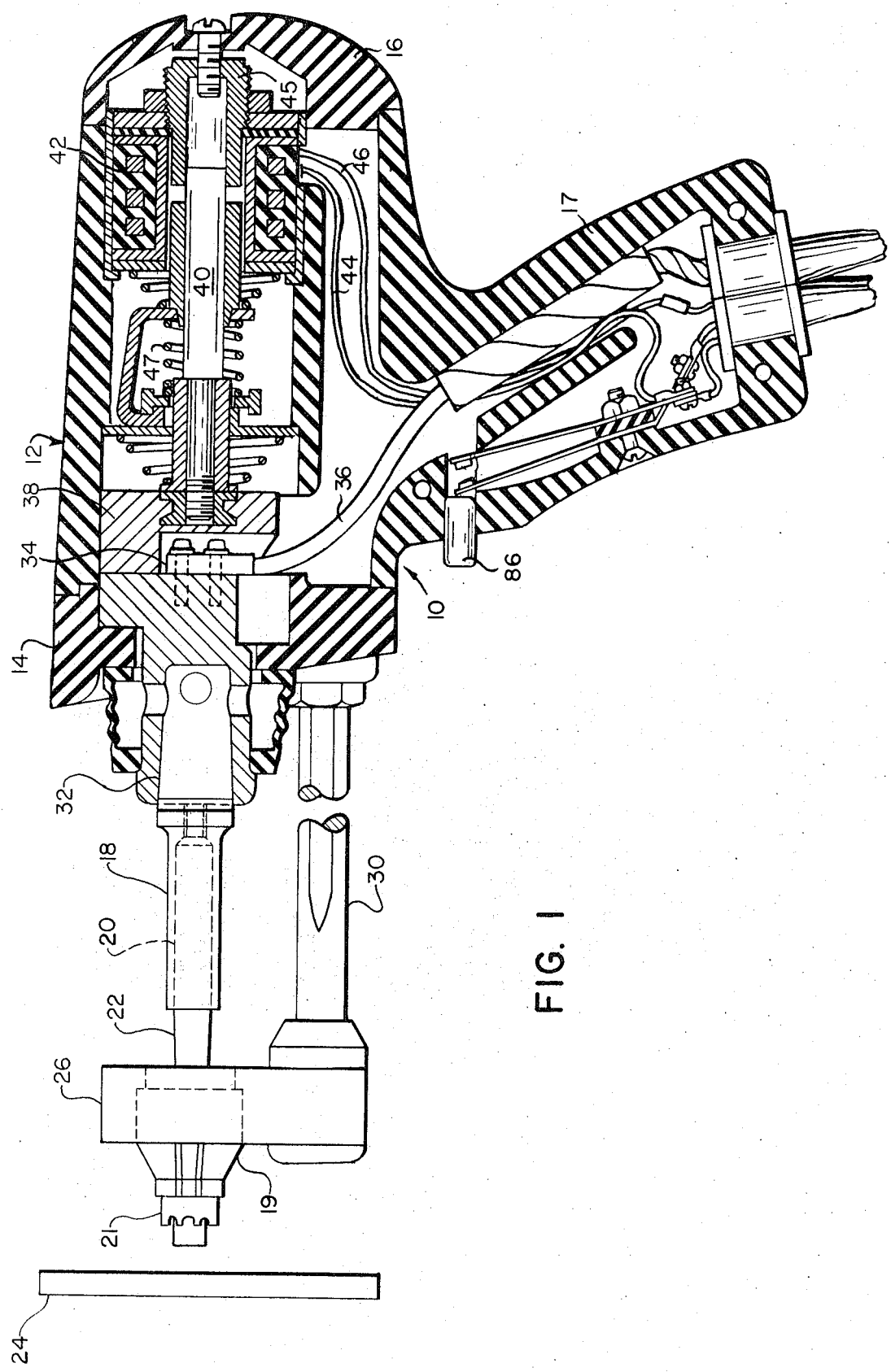
FIG. 1 is a section taken through the gun.

Referring to FIG. 1, a stud welding tool with which the invention can be embodied is indicated at 10 and is of conventional design requiring no additional components to enable practice of the invention. The tool 10 includes a main housing 12 of dielectric material having a front wall 14 and a rear cap 16. The housing 12 has a handle 17. A chuck 18 is located at the forward end of the tool and has a slotted recess 20 to receive a stud 22 which is to be welded to a workpiece 24. The stud 22 can be of any suitable type although the invention has been found to be particularly advantageous when employed with the welding of studs by a high intensity short welding arc. A suitable foot 26 is spaced forwardly of the chuck 18 and has a through aperture whose axis is coaxial with the axis of the chuck 18. A ferrule grip 19 is inserted into the aperture of the foot 26 and is secured thereto by a set screw. A ferrule 21 is placed in the ferrule grip 19 with the stud 22 extending therethrough. The supporting foot 26 is held in front of the tool 10 by a pair of adjustable legs 30 mounted on the main housing 12.

The stud chuck 18 is attached to a chuck leg 32 which is electrically connected by a cable clamp 34 which in turn is connected to a main welding cable 36. A rear cable clamp part 38 is attached to the clamp 34 and has a solenoid core 40 affixed thereto. The core 40 moves rearwardly and longitudinally of the tool 10 along with the cable clamp parts 34, 38, the eg 32, the chuck 18 and the stud 22. The core 40 extends into a lifting and holding coil 42 and is pulled or retracted into the coil when power is supplied through leads 44, 46. An adjustable stop 45 at the rear of the coil 42 determines the extent to which the stud 22 is retracted from the workpiece 24 during the welding cycle. A return or plunge spring 47 plunges the stud 22 back to the workpiece 24 after the main welding arc has been established therebetween for a period of time and after the current to the coil 42 is shut off.

The timing of the main welding arc depends on such factors as the size of the studs being welded. Larger studs generally require a main welding arc of longer duration than smaller ones. The main welding arc preferably is maintained substantially until the stud plunges against the workpiece to assure that metal melted by the main welding arc will not solidify prior to contact.

Figure 2:
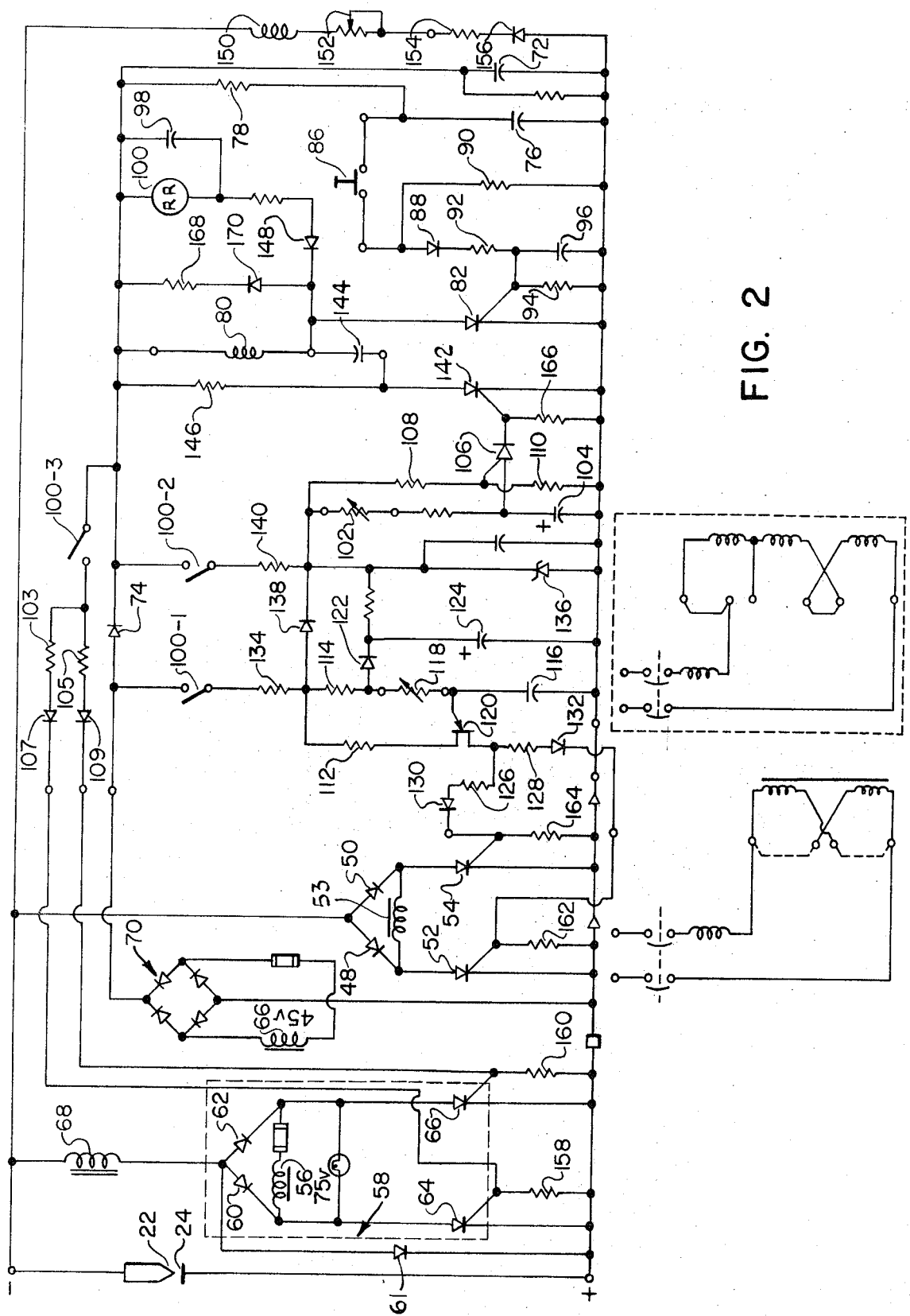
FIG. 2 is a diagrammatic view of the control circuit.

In FIG. 2 there is shown a diagrammatic view of the control circuit. The diodes 48, 50 and the silicon controlled rectifiers 52, 54 make up a single phase bridge rectifier. There is no output from the bridge rectifier and its transformer winding 53, the voltage output of which is otherwise conventional, as long as the rectifiers 52, 54 are non-conducting. The bridge supplies the main welding current and by delay phase firing of the rectifiers 52, 54, the output energy is controlled. In order to sustain an arc during the period that the rectifiers 52, 54 are non-conducting, a low energy sustaining source is used. The arc formed by the low energy source is not the same as the pilot arc found in the prior art, inasmuch as it is not terminated by the main welding current. The arc sustaining source comprises a 75 volt winding 56 on the transformer, a sustaining arc full wave bridge rectifier 58 delineated by a broken line, consisting of the diodes 60, 62 and the silicon controlled rectifiers 64, 66. The output of this bridge occurs only when the SCR's 64, 66 are conducting. The output of the sustaining arc bridge 58 passes through an inductance 68. The inductance 68 and the diode 61 form a free wheeling circuit to maintain current flow through the arc during the period when the supply voltage from the transformer 56 passes through zero. The SCR's 64, 66 are provided with continuous gate signals for the duration of the weld period. Phase delayed gate signals are applied to the gates of the SCR's 52, 54 from a pulse generating circuit for the duration of the weld as will be explained more fully hereinafter.

The power, timing and initiation circuitry for the main welding control and the arc sustaining source has as its source a 45 volt winding 66 on the transformer whose output is rectified by the full wave rectifier 70. The fully rectified output is coupled to a filter capacitor 72 through the main blocking diode 74. The voltage at the anode of the main blocking diode 74 will be unfiltered voltage from the full wave rectifier 70 while the voltage at the cathode of the main blocking diode 74 will be filtered voltage. The voltage at the cathode of the main blocking diode 74 will be a substantially steady DC potential due to the stored charge on the filter capacitor 72.

The capacitor 76 is charged through the limiting resistor 78 from the potential established on the filter capacitor 72. The gun solenoid 80 will be energized when the gun SCR 82 is gated on. Energizing of the gun solenoid 80 will cause the gun elements to withdraw the stud 22 a predetermined distance from the work surface 24 allowing a sustaining arc to be established. The stud 22 in the chuck 18 was pressed against the work surface 24 at the start of the weld. (The current for the sustaining arc is supplied by the 75 volt source 56 through the SCR's 64, 66, the diodes 60, 62 and the inductance 68.) The gun SCR 82 is gated on by momentarily coupling the energy from the capacitor 76 to the gate of the gun SCR 82 when an operator actuates the gun button 86 which allows current to pass through the transient voltage suppression network of the diode 88, the resistors 90, 92, 94 and the capacitor 96. The capacitor 76 is prevented from recharging over the threshold voltage of the diode 88 due to the limiting action of the limiting resistor 78. The diode 88 may be a voltage breakdown device such as a zener diode to further enhance transient protection.

With the gun SCR 82 conducting, the charge on the capacitor 98 energizes the reed relay 100 causing the normally open contacts thereof 100-1, 100-2, and 100-3 to close. The closing of the contacts 100-3 will apply filtered DC through resistors 103, 105 and diodes 107, 109 to the gates of SCR's 64, 66 causing the sustaining arc current to flow and a sustaining arc to be impressed between the stud 22 and the workpiece 24; this is a low intensity arc. The closing of the contacts 100-2 will energize a timing circuit consisting of a variable resistor 102, the capacitor 104 and the programmable unijunction transistor 106 with its biasing resistors 108 and 110. The closing of the contacts 100-1 energizes the synchronized pulse generating circuit of the resistor 112, the timing resistor 114, the capacitor 116, the variable resistor 118 and the unijunction transistor 120. The voltage on the capacitor 116 will rise at a rate dependent upon the setting of the variable resistor 118 until it reaches the firing voltage of the unijunction transistor 120. Because of the circuit formed by the diode 122 and the capacitor 124, the initial voltage necessary to fire the unijunction transistor 120 will be dependent on the time constant set up by the resistor 114 and the capacitor 124. This latter time constant will create a delay in the first pulse generated by the unijunction transistor 120 to assure sufficient time for withdrawal of the stud 22 from the workpiece 24 to establish a stable sustaining arc.

When the unijunction transistor 120 is fired, a pulse is coupled through the resistors 126, 128 and the diodes 130, 132 to the gates of the power silicon controlled rectifiers 52, 54. These pulses are synchronized to the welding source voltage winding 53 of the transformer. Due to the fact that the charging voltage of the capacitor 116 is obtained through a limiting resistor 134 from the unfiltered output of the full wave rectifier 70, the charging voltage is limited by the action of the zener diode 136 and the blocking diode 138. The DC voltage across the zener diode 136 is supplied through the circuit formed by the closing of the contacts 100-2 and current limiting resistor 140.

A portion of the voltage across the zener diode 136 is supplied to the timing circuit comprising the biasing resistor 108, 110 the variable resistor 102, the capacitor 104 and the programmable unijunction transistor 106. The voltage on the capacitor 104 will rise at a rate determined by the value of the variable resistor 102 until the firing potential of the programmable unijunction transistor 106, as set by biasing resistors 108 and 110, is reached. When the programmable unijunction transistor 106 fires, a pulse will be coupled to the gate of the SCR 142 thereby placing it in a conducting state. When the SCR 142 is conducting the capacitor 144, previously charged through the resistor 146 and the gun SCR 82, will discharge across the gun SCR 82 reverse biasing it and thereby causing it to turn off. When the gun SCR 82 is turned off, current is removed from the gun solenoid 80 and from the reed relay 100 de-energizing the gun solenoid 80 and allowing the return or plunge spring 47 to plunge the stud 22 into the molten pool of metal which is produced by the heat of the welding arc thereby completing the weld. The reed relay 100 due to the charge on the capacitor 98 will not drop out immediately but will remain actuated until a short time after the gun solenoid 80 has been deactivated thus assuring the stud 22 will plunge into the molten pool on the workpiece 24 while current is still flowing. The diode 148 prevents the capacitor 98 from discharging into the gun coil.

A safety shut down circuit is provided which includes a time delay circuit breaker 150 in series with a variable resistance 152, a resistance 154 and a diode 156. The circuit including the time delay circuit breaker 150 is placed across the outputs and if the control circuit does not time out, then the breaker will trip.

The resistors 158, 160, 162, 164 and 166 are load resistors attached to the gates of the respective SCR's. A free wheeling circuit comprising a resistor 168 and a diode 170 in series therewith is placed across the gun coil to suppress any voltage spikes which may occur when the gun SCR 82 turns off.

With reference to the foregoing description it is to be understood that what has been disclosed herein represents an embodiment of the invention and is to be construed as illustrative rather than restrictive in nature and that the invention is best described by the following claims.

1. Apparatus for welding a stud to a workpiece comprising a welding tool having a chuck for holding a stud, means for retracting the chuck, and means for plunging the chuck toward the workpiece, a first alternating current power supply, a second alternating current power supply, a third alternating current power supply, means for establishing a main welding arc between the stud and the workpiece from the first power supply, means for establishing a sustaining arc between the stud and the workpiece from the second power supply before the main welding arc is established and for continuing the sustaining arc during the welding arc, means for initiating a welding cycle, including actuating said retracting means, initiating said sustaining arc, and initiating said welding arc after a delay, a full wave rectifier in series with said third power supply, a blocking diode in series with said full wave rectifier, a filter capacitor in series with said blocking diode, said means for establishing the welding arc being connected with said blocking diode whereby pulsing DC power is applied to said means for establishing the welding arc, adjustable means for controlling the intensity of said welding arc, and means for enabling said plunging means to plunge the chuck toward the workpiece.

2. Apparatus for welding a chuck to a workpiece comprising a welding tool having a chuck for holding a stud, means for retracting the chuck, and means for plunging the chuck toward the workpiece, a first alternating current power supply, a second alternating current power supply, a third alternating current power supply, means for establishing a main welding arc between the stud and the workpiece from the first power supply, means for establishing a sustaining arc between the stud and the workpiece from the second power supply before the main welding arc is established and for continuing the sustaning arc during the welding arc, means for initiating a welding cycle, including actuating said retracting means, initiating said sustaining arc, and initiating said welding arc after a delay, a full wave rectifier in series with the third power supply, a blocking diode in series therewith, a filter capacitor in series with said blocking diode, said means for establishing the sustaining arc being connected to the blocking diode whereby substantially steady state DC power is applied to the means for establishing the sustaining arc, adjustable means for controlling the intensity of said welding arc, and means for enabling said plunging means to plunge the chuck toward the workpiece.

3. Apparatus for welding a stud to a workpiece comprising a welding tool having a chuck for holding a stud, means for retracting the chuck, and means for plunging the chuck toward the workpiece, a first alternating current power supply, a second alternating current power supply, a third alternating current power supply, means for establishing a main welding arc between the stud and the workpiece from the first power supply, means for establishing a sustaining arc between the stud and the workpiece from the second power supply before the main welding arc is established and for continuing the sustaining arc during the welding arc, means including said third power supply for initiating a welding cycle, including actuating said retracting means, initiating said sustaining arc, and initiating said welding arc after a delay, adjustable means for controlling the intensity of said welding arc, and means for enabling said plunging means to plunge the chuck toward the workpiece, said means for enabling said plunging means to plunge the chuck toward the workpiece comprises a first SCR in series with a capacitor, both of which are in electrical parallel relation with an SCR of the welding tool, whereby actuation of the first SCR will cause the capacitor to discharge, reverse biasing the tool SCR when it is conducting.

4. Apparatus for welding a stud to a workpiece comprising a welding tool having a chuck for holding a stud, means for retracting the chuck, and means for plunging the chuck toward the workpiece, means for establishing a main welding arc between the stud and the workpiece, means for establishing a sustaining arc between the stud and the workpiece before the main welding arc is established and for continuing the sustaining arc during the welding arc, means for establishing a single phase alternating current power source, means for full wave rectifying power from said alternating current power source, control means for initiating a welding cycle, including actuating said retracting means, initiating said sustaining arc, and initiating said welding arc after a delay, means for supplying full wave rectified power from said alternating current power source and said rectifying means to said control means, adjustable means for controlling the intensity of said welding arc, means for enabling said plunging means to plunge the chuck toward the workpiece, and means for filtering the full wave rectified power supplied to that portion of said control means which initiates said sustaining arc, including means for supplying a portion of the filtered full wave rectified power to said enabling means, the full wave rectified power supplied to that portion of said control means which initiates said welding arc after a delay being unfiltered.

5. Apparatus for welding a stud to a workpiece comprising a welding tool having a chuck for holding a stud, means for retracting the chuck, and means for plunging the chuck toward the workpiece, means for establishing a first power source of single phase alternating current, control means connected with said first power source for establishing a sustaining arc between the stud and the workpiece when the stud is retracted from the workpiece by the retracting means, means for subsequently establishing a main welding arc between the stud and the workpiece while continuing the sustaining arc, said main welding arc means comprising a second single phase alternating current power source, phase delay control means for controlling the intensity of the main welding arc by phase delay control of the welding arc power, means establishing a third power source of full wave rectified alternating current, means for supplying filtered full wave rectified current from said third power source to said sustaining arc control means, and means for supplying unfiltered full wave rectified current from said third power source to said phase delay control means.

* * * * *